(No Model.)
R. M. & J. M. BROOKS.
COMBINED SEED PLANTER AND FERTILIZER DISTRIBUTER.
No. 339,967. Patented Apr. 13, 1886.
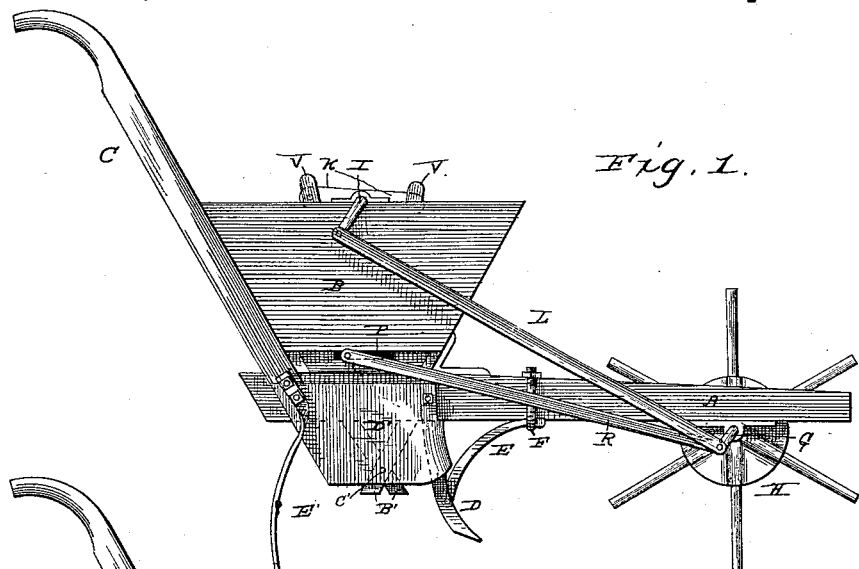
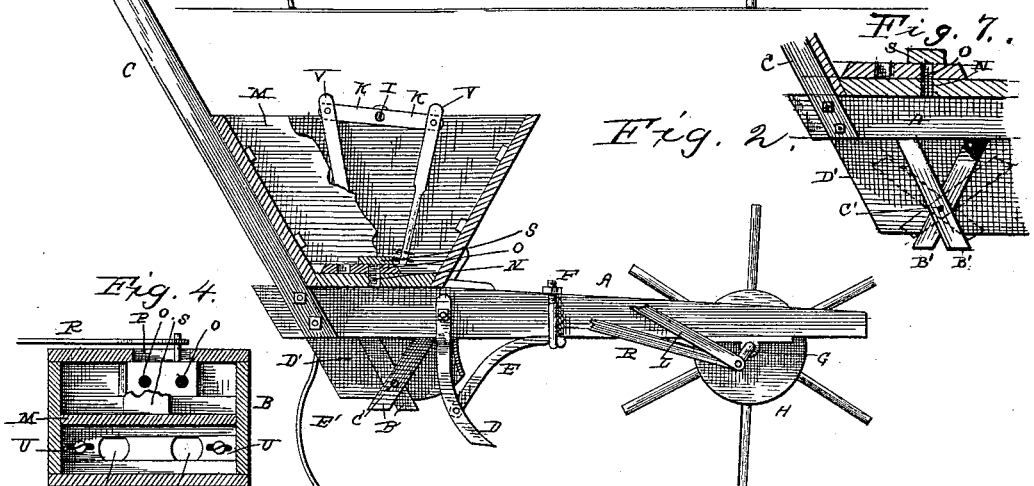
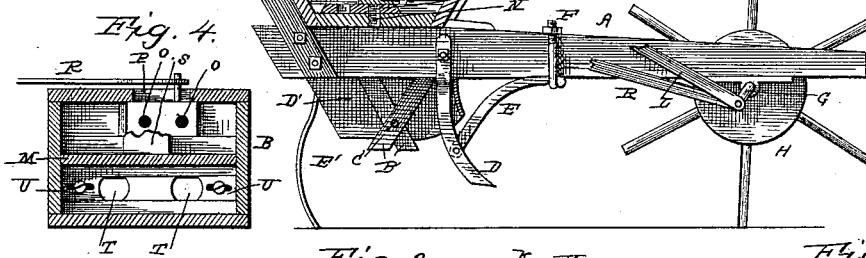
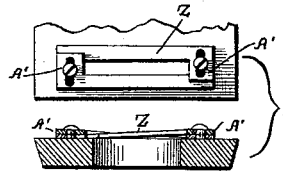
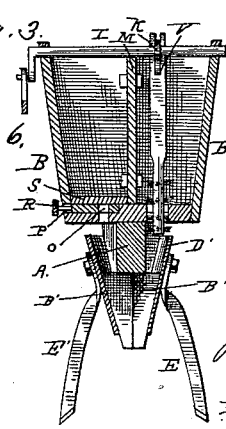
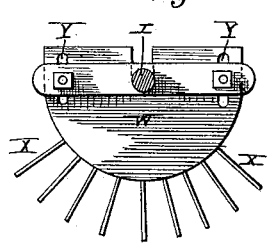
WITNESSES
INVENTORS.

UNITED STATES PATENT OFFICE.

RHODOM M. BROOKS AND JAMES M. BROOKS, OF JENKINSVILLE, GEORGIA.

COMBINED SEED-PLANTER AND FERTILIZER-DISTRIBUTER.

SPECIFICATION forming part of Letters Patent No. 339,967, dated April 13, 1886.

Application filed August 31, 1885. Serial No. 175,747. (No model.)

*To all whom it may concern:*

Be it known that we, RHODOM M. BROOKS and JAMES M. BROOKS, citizens of the United States, residing at Jenkinsville, in the county of Pike and State of Georgia, have invented certain new and useful Improvements in Combined Seed-Planters and Fertilizer-Distributers, of which the following is a specification, reference being had therein to the accompanying drawings.

Our invention relates to improvements in planters and fertilizer-distributers, and is designed to produce a device for the purpose that shall be adaptable for various kinds of seeds, and that shall be effective in its operation, depositing the fertilizer and the seeds in the proper relation one to the other.

In describing the device reference is had to the annexed drawings, in which Figure 1 represents a side elevation of the device; Fig. 2, a similar view partially sectioned; Fig. 3, a vertical cross-section taken through the hopper; Fig. 4, a horizontal section through the hopper; Fig. 5, a side view of the agitator, showing the manner of connection; and Fig. 6, details of a form of opening-regulator; Fig. 7, a detail showing the adjustment of the guides.

The stock A carries the hopper B and handles C. Hung pivotally from the stock A, in front of the lower part of the hopper, is the opener D, adjustable forward or backward by means of a bar, E, pivoted to said opener and held to the stock by a stirrup or clip, F, clamping its upper end to said stock. The opener may thus be adjusted at any desired angle and the depth of cut regulated. Near the front of the stock is journaled a crank-shaft, G, carrying a rimless wheel, H, (which is the preferred form.) On the top of the hopper is journaled a transverse crank-shaft, I, carrying near one side of the hopper arms K, projecting in opposite directions, and preferably formed integral one with the other. From the crank on the shaft G to the crank on the shaft I extends a pitman, L, which, as the shaft G revolves, imparts a rocking motion to the shaft I.

A removable partition, M, divides the hopper longitudinally, forming a guano-chamber in one side and a seed-chamber in the other side. The bottom of the seed-chamber has a perforation, N, over which travels a sliding carrier, O, provided with two holes, (more or less.) From the slide extends a pin through a slot, P, in the side of the hopper, connecting to a pitman, R, the other end of which is secured to the crank on the shaft G, thus imparting a reciprocating motion to said slide, thereby depositing the seed alternately from the said holes, a stream of seed through them being prevented by a cut-off board, S.

The guano-chamber has its bottom provided with one or more perforations, T, adjustable as to size by the sections U. (Shown in Fig. 4.) Through these perforations T pass the brush ends of reciprocating arms or rods V, pivotally hung from the arms K, forcing the guano through said perforations and preventing the gumming of the passages.

When it is desirable to drill cotton or like seed, the rods or staffs V are removed and the agitator, consisting of a half-disk, W, with radial pins X, is substituted, slots Y being provided for adjustably fastening the same. When the agitator is used, the device shown in Fig. 6 is preferred. In place of the sections U are provided strips Z, with right-angle-slotted extensions A', so arranged that a varying space may be left between the strips Z over the passage in the bottom of the hopper.

In drilling cotton-seed the agitator should be adjusted as low as possible, so the pins will rest between the strips Z.

As it is often necessary to plant the seed with the guano a little deeper, guides B'—one leading from the guano-opening toward the opener, and one leading from the seed-opening backward—are provided. These being adjustable as to slant on the pivot C', and the furrow being more or less shallow as it recedes from the opener, the depth of the guano below the seed may be easily adjusted. The adjustment of the guides B' is effected by moving them on the said pivot C', so as to make their slant greater or less, and thus throw the material at a greater or less distance to the front or rear, as the case may be.

A funnel, D', prevents the spilling of the material of the hopper after having passed the openings in the bottom. Coverers E' are secured to this funnel and project somewhat to the rear.

We claim—

A planter consisting of a suitable hopper with chambers or compartments, an agitator and seed-dropping mechanism contained therein, pitmen leading therefrom to a crank-shaft carrying the drive-wheel, adjustable guides leading from the bottom of the said chambers, respectively, forward and rearward, and a funnel surrounding said guides, substantially as specified.

In testimony whereof we affix our signatures in presence of two witnesses.

RHODOM M. BROOKS.
JAMES M. BROOKS.

Witnesses:
WM. O. GWYN,
W. M. HARTLEY.